(12) United States Patent
Belakshe et al.

(10) Patent No.: US 11,377,581 B2
(45) Date of Patent: Jul. 5, 2022

(54) COMPOSITIONS AND METHODS FOR CONTROLLING MIGRATION OF PARTICULATES

(71) Applicant: HALLIBURTON ENERGY SERVICES, INC., Houston, TX (US)

(72) Inventors: Ravikant S. Belakshe, Pune (IN); Sumit Ramesh Songire, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 17/266,845

(22) PCT Filed: Nov. 7, 2018

(86) PCT No.: PCT/US2018/059644
§ 371 (c)(1),
(2) Date: Feb. 8, 2021

(87) PCT Pub. No.: WO2020/096589
PCT Pub. Date: May 14, 2020

(65) Prior Publication Data
US 2021/0214602 A1    Jul. 15, 2021

(51) Int. Cl.
| | | |
|---|---|---|
| *C09K 8/575* | (2006.01) | |
| *C09K 8/508* | (2006.01) | |
| *C09K 8/68* | (2006.01) | |
| *C09K 8/80* | (2006.01) | |
| *E21B 33/138* | (2006.01) | |

(Continued)

(52) U.S. Cl.
CPC .......... *C09K 8/5086* (2013.01); *C09K 8/5755* (2013.01); *C09K 8/68* (2013.01); *C09K 8/80* (2013.01); *E21B 33/138* (2013.01); *E21B 43/267* (2013.01); *E21B 43/04* (2013.01)

(58) Field of Classification Search
None
See application file for complete search history.

(56) References Cited

U.S. PATENT DOCUMENTS

| | | | |
|---|---|---|---|
| 6,024,170 A | * | 2/2000 | McCabe ................ C09K 8/685 507/903 |
| 7,013,976 B2 | | 3/2006 | Nguyen et al. |
| 7,407,010 B2 | | 8/2008 | Rickman et al. |

(Continued)

FOREIGN PATENT DOCUMENTS

| | | |
|---|---|---|
| CN | 107573911 A | 1/2018 |
| WO | WO 2005/121501 A2 | 12/2005 |

(Continued)

OTHER PUBLICATIONS

International Search Report and Written Opinion received in International Application No. PCT/US2018/059644, dated Sep. 2, 2019, 9 pages.

(Continued)

*Primary Examiner* — Andrew Sue-Ako
(74) *Attorney, Agent, or Firm* — Haynes and Boone, LLP (57) ABSTRACT

Methods of treating a subterranean formation include providing a treatment fluid including a composition of a borate salt, an amine, and an organosilane; introducing the treatment fluid into the formation; and curing the composition to at least partially consolidate unconsolidated particulates in the formation.

20 Claims, 4 Drawing Sheets

(51) Int. Cl.
*E21B 43/267* (2006.01)
*E21B 43/04* (2006.01)

(56) References Cited

U.S. PATENT DOCUMENTS

| | | |
|---|---|---|
| 7,448,451 B2 | 11/2008 | Nguyen et al. |
| 8,551,924 B2 | 10/2013 | Rickman et al. |
| 8,950,493 B2 | 2/2015 | van Petegem et al. |
| 9,562,188 B2 | 2/2017 | Monroe et al. |
| 2005/0000731 A1* | 1/2005 | Nguyen ............... C09K 8/5753 175/215 |
| 2006/0020062 A1 | 1/2006 | Bloom |
| 2006/0219405 A1 | 10/2006 | Nguyen et al. |
| 2007/0179065 A1 | 8/2007 | Nguyen |
| 2009/0095535 A1 | 4/2009 | Nguyen |
| 2010/0147515 A1 | 6/2010 | Hughes et al. |
| 2012/0205107 A1 | 8/2012 | Rickman et al. |
| 2015/0252649 A1 | 9/2015 | Tang |
| 2017/0101575 A1* | 4/2017 | Wadekar ................. C04B 26/10 |
| 2017/0247602 A1* | 8/2017 | Belakshe ................. C09K 8/92 |
| 2018/0238160 A1* | 8/2018 | Nguyen ................. E21B 43/26 |
| 2018/0346801 A1* | 12/2018 | Dandawate ............ C09K 8/506 |

FOREIGN PATENT DOCUMENTS

| | | | |
|---|---|---|---|
| WO | WO 2006/014483 A2 | 2/2006 | |
| WO | WO 2017/065804 A1 | 4/2017 | |
| WO | WO 2017/116467 | * 7/2017 | ............. C09K 8/506 |

OTHER PUBLICATIONS

Nguyen, Philip D., et al., SPE 86559, Stabilizing Wellbores in Unconsolidated, Clay-Laden Formations, Feb. 2004, 16 pages, SPE International Society of Petroleum Engineers, Society of Petroleum Engineers Inc.

* cited by examiner

Fig. 4

COMPOSITIONS AND METHODS FOR CONTROLLING MIGRATION OF PARTICULATES

CROSS-REFERENCE TO RELATED APPLICATION

The present application is a U.S. National Stage patent application of International Patent Application No. PCT/US2018/059644, filed on Nov. 7, 2018, the benefit of which is claimed and the disclosure of which is incorporated herein by reference in its entirety.

BACKGROUND

The present disclosure generally relates to compositions and methods for consolidating particles in a subterranean formation. In particular, the present disclosure relates to compositions and methods for controlling the migration of particulates, such as proppant (e.g., microproppant) and formation sands, in subterranean formations using a combination of a borate salt, an amine, and an organosilane.

Hydrocarbon wells are often located in subterranean zones that contain unconsolidated particulates that may migrate within the subterranean formation with the oil, gas, water, and/or other fluids produced by the wells. The presence of particulates, such as formation sand, in produced fluids is disadvantageous and undesirable in that the particulates may abrade pumping and other producing equipment and reduce the fluid production capabilities of the producing zones. As used herein, the term "unconsolidated," when used to refer to a portion of a subterranean formation, refers to portions that contain loose particulates and portions that contain bonded particulates that have insufficient bond strength to withstand the forces produced by the production of fluids through the zones.

A type of particulate migration that may affect fluid conductivity in the formation is the flow back of unconsolidated particulate material (e.g., formation fines, proppant particulates, sand, etc.) through the conductive channels in the subterranean formation, which can, for example, clog the conductive channels and/or damage the interior of the formation or equipment. There are several known techniques used to control particulate migration, some of which may involve the use of consolidating agents. The term "consolidating agent" as used herein includes any compound that can minimize particulate migration in a subterranean formation and/or modify the stress-activated reactivity of subterranean fracture faces and other surfaces in subterranean formations.

One well-known technique used to control particulate migration in subterranean formations is commonly referred to as "gravel packing," which involves the placement of a filtration bed of gravel particulates in the subterranean formation that acts as a barrier to prevent particulates from flowing into the wellbore. These gravel packing operations may involve the use of consolidating agents to bind the gravel particulates together in order to form a porous matrix through which formation fluids can pass.

In some situations, a hydraulic fracturing treatment and a gravel-packing treatment may be combined into a single treatment. In such "frac pack" operations, the fracturing and gravel-packing treatments are combined and may generally be completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Another technique that may be used to control particulate migration involves coating proppant particulates with a consolidating agent to facilitate their consolidation within the formation and to prevent their subsequent flow back through the conductive channels in the subterranean formation.

Yet another method used to control particulate migration involves consolidating unconsolidated portions of subterranean zones into relatively stable permeable masses by applying a consolidating agent to an unconsolidated portion of the subterranean formation. One example of this method is applying a resin to a portion of the zone, followed by a spacer fluid and then a catalyst. Such resin application may be problematic when, for example, an insufficient amount of spacer fluid is used between the application of the resin and the application of the external catalyst. In that case, the resin may come into contact with the external catalyst earlier in the process such as in the wellbore itself rather than in the unconsolidated subterranean formation. Furthermore, there may be uncertainty as to whether there is adequate contact between the resin and the catalyst. The terms "catalyst," "hardening agent," and "curing agent" may be used herein interchangeably and collectively may refer to a composition that effects the hardening of a resin composition by any means or mechanism. Another example of this method involves applying a tackifying composition (aqueous or non-aqueous) to a portion of the formation in an effort to reduce the migration of particulates therein. Whereas a curable resin composition produces a hard mass, the use of a tackifying composition is thought to result in a more malleable consolidated mass.

Although consolidating agents are used frequently, they may be difficult to handle, transport and clean-up due to their inherent tendency to stick to equipment or anything else with which they may come into contact. Thus, there is a continuing need for improved consolidating agents and methods.

BRIEF DESCRIPTION OF THE DRAWINGS

The following figures are included to illustrate certain aspects of the present disclosure, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

According to several exemplary embodiments, the present disclosure describes methods and compositions useful in treating subterranean formations, and more particularly, to consolidating formation fines, reducing proppant flow back, and consolidating relatively unconsolidated portions in a subterranean formation (referred to collectively herein as "particulate migration"). According to several exemplary embodiments, a treatment fluid including a composition of a borate salt, an amine, and an organosilane is introduced into a subterranean formation to control the migration of particulates (e.g., sand and proppants).

According to several exemplary embodiments, the composition is used to control siliceous particulate (e.g., formation sand) migration in a subterranean formation. According to several exemplary embodiments, the composition consolidates the siliceous particulates by consolidating them in the formation or in fractures.

According to several exemplary embodiments, the composition is pumped into a subterranean formation below fracture pressure. If additional strength is desired, a strength enhancer such as tridimethylaminomethyl phenol is mixed with the composition. According to several exemplary embodiments, the composition is allowed to contact the sand, and the composition on the sand is allowed to cure at bottom bole static temperature for a certain duration. According to several exemplary embodiments, the chosen period of time needed for the composition to substantially cure depends on the temperature of the formation and the unconfined compressive strength (UCS) needed in the particular application. Generally, the period of time will be between about 0.5 hours and about 72 hours, for example between about 24 hours and about 48 hours. Determining the proper cure time is within the ability of one of ordinary skill in the art with the benefit of this disclosure.

According to several exemplary embodiments, the composition is used to consolidate microproppant in secondary fractures in shale formations. According to several exemplary embodiments, a slurry of microproppant, a borate salt, an amine, and an organosilane is pumped into a subterranean formation above fracture pressure. In other exemplary embodiments, the slurry also includes tridimethylaminomethyl phenol. According to several exemplary embodiments, the slurry is allowed to cure in the microfractures to keep the microfractures open.

According to several exemplary embodiments, the composition provides consolidation of particulates, is easier to handle when compared to conventionally used resin treatments, and significantly reduces the issues associated with current systems of early curing, cleaning and damage caused to formation and completions. According to several exemplary embodiments, the composition is less expensive than traditional treatments.

According to several exemplary embodiments, the composition achieves a regain permeability of at least about 60%. The term "regain permeability" refers to the percentage of permeability of a portion of a subterranean formation following treatment; that is, it is a percentage of the post-treatment permeability as compared to the pre-treatment permeability. According to several exemplary embodiments, the composition achieves a regain permeability of at least about 70%, for example at least about 75%, 80%, 85%, or 90%.

According to several exemplary embodiments, the composition can be introduced ahead of, along with, or following any well treatment procedure, including but not limited to hydraulic fracturing treatments, gravel packing treatments, and acidizing treatments. The term "introducing" or its variations, as used herein, includes pumping, injecting, pouring, releasing, displacing, spotting, circulating, or otherwise placing a fluid or material within a well, wellbore, or subterranean formation using any suitable manner known in the art. The composition can also include other materials that do not adversely affect the benefits of the composition.

According to several exemplary embodiments, a method of treating a subterranean formation is provided. According to several exemplary embodiments, the method includes providing a treatment fluid including a composition including a borate salt, an amine, and an organosilane; introducing the treatment fluid into the formation; and curing the composition to at least partially consolidate unconsolidated particulates in the subterranean formation. According to several exemplary embodiments, the unconsolidated particulates are introduced into the formation as part of the treatment fluid.

According to several exemplary embodiments, the unconsolidated particulates reside in a portion of the formation. According to several exemplary embodiments, the method includes allowing the composition to contact at least a portion of the unconsolidated particulates residing in a portion of the formation and curing the composition to at least partially consolidate the unconsolidated particulates, wherein the portion of the formation contacted with the composition has a regain permeability of at least about 60%.

According to several exemplary embodiments, the borate salt is present in an amount of about 5% to about 20% (w/v) of the composition, the amine is present in an amount of about 5% to about 10% by volume of the composition, and the organosilane is present in an amount of about 5% to about 10% by volume of the composition.

According to several exemplary embodiments, the borate salt includes one or more of boric acid, sodium octaborate, disodium octaborate tetrahydrate, sodium diborate, pentaborates, sodium borate pentahydrate, sodium borate decahydrate, sodium metaborate, or sodium tetraborate; the amine includes one or more of polyethylenimine, piperazine, derivatives of piperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethyleneimine, indazole, 2-ethyl-4-methyl imidazolepolyethylenimine, ethylenediamine, diethylenetriamine, triethylene tetraamine, or amino ethyl piperazine; or the organosilane includes one or more of N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilanes, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta (aminoethyl)-r-aminopropyl-trimethoxysilane, N-beta (aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltrichlorosilane, vinyltris (betamethoxyethoxy) silane, r-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta (aminoethyl)-r-aminopropyltrimethoxysilane, N-beta (aminoethyl)-r-aminopropylmethyldimethoxysilane, r-aminopropyltriethoxysilane, N-phenyl-r-aminopropyltrimethoxysilane, r-mercaptopropyltrimethoxysilane, or r-chloropropyltrimethoxysilane. According to several exemplary embodiments, the borate salt includes sodium octaborate, the amine includes polyethylenimine, or the organosilane includes N-beta-(aminoethyl)-gamma-aminopropyltrimethoxysilane.

According to several exemplary embodiments, the composition further includes a strength enhancer, such as tridimethylaminomethyl phenol. According to several exemplary embodiments, tridimethylaminomethyl phenol is present in an amount of about 5% to about 10% by volume of the composition.

According to several exemplary embodiments, the unconsolidated particulates include sand. According to several exemplary embodiments, the treatment fluid is introduced at a pressure below a pressure sufficient to create a fracture in the formation.

According to several exemplary embodiments, the unconsolidated particulates include microproppant particulates. According to several exemplary embodiments, the treatment fluid is introduced at a pressure sufficient to create or enhance a fracture in the formation. According to several exemplary embodiments, the treatment fluid further includes the microproppant particulates, and the composition further includes tridimethylaminomethyl phenol.

According to several exemplary embodiments, a composition for consolidating unconsolidated particulates in a subterranean formation is provided. According to several exemplary embodiments, the composition includes a borate salt, an amine, and an organosilane. The composition may achieve a regain permeability of at least about 70%.

According to several exemplary embodiments, in the composition, the borate salt is present in an amount of about 5% to about 20% (w/v) of the composition, the amine is present in an amount of about 5% to about 10% by volume of the composition, and the organosilane is present in an amount of about 5% to about 10% by volume of the composition.

According to several exemplary embodiments, the composition further includes tridimethylaminomethyl phenol. According to several exemplary embodiments, the tridimethylaminomethyl phenol is present in an amount of about 5% to about 10% by volume of the composition.

According to several exemplary embodiments, in the composition, the borate salt includes one or more of boric acid, sodium octaborate, disodium octaborate tetrahydrate, sodium diborate, pentaborates, sodium borate pentahydrate, sodium borate decahydrate, sodium metaborate, or sodium tetraborate; the amine includes one or more of polyethylenimine, piperazine, derivatives of piperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethyleneimine, indazole, 2-ethyl-4-methyl imidazolepolyethylenimine, ethylenediamine, diethylenetriamine, triethylene tetraamine, or amino ethyl piperazine; or the organosilane includes one or more of N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilanes, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta (aminoethyl)-r-aminopropyl-trimethoxysilane, N-beta (aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltrichlorosilane, vinyltris (betamethoxyethoxy) silane, r-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta (aminoethyl)-r-aminopropyltrimethoxysilane, N-beta (aminoethyl)-r-aminopropylmethyldimethoxysilane, r-aminopropyltriethoxysilane, N-phenyl-r-aminopropyltrimethoxysilane, r-mercaptopropyltrimethoxysilane, or r-chloropropyltrimethoxysilane. According to several exemplary embodiments, in the composition, the borate salt includes sodium octaborate, the amine includes polyethylenimine, or the organosilane includes N-beta-(aminoethyl)-gamma-aminopropyltrimethoxysilane.

According to several exemplary embodiments, the composition has an unconfined compressive strength of at least about 100 psi after curing at 180° F. for about 24 hours.

Figure 1:
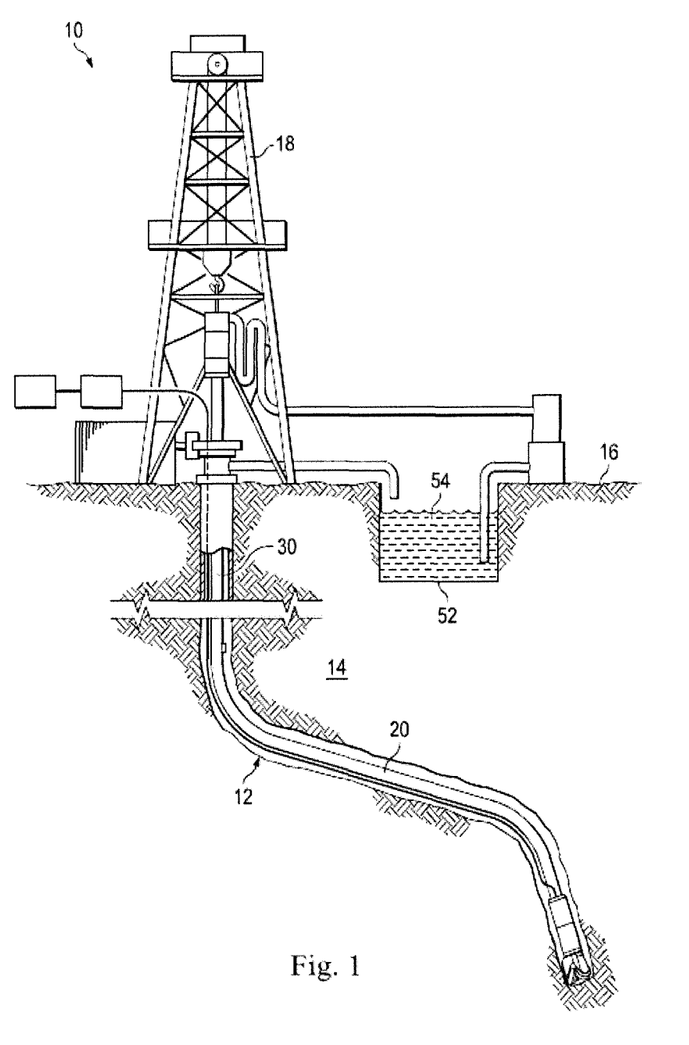
FIG. 1 illustrates a land-based drilling and production system.

Turning now to FIG. 1, shown is an elevation view in partial cross-section of a wellbore drilling and production system 10 utilized to produce hydrocarbons from wellbore 12 extending through various earth strata in an oil and gas formation 14 located below the earth's surface 16. Drilling and production system 10 may include a drilling rig or derrick 18 to perform various activities related to drilling or production, such as the methods described below. Likewise, drilling and production system 10 may include various types of tools or equipment 20 supported by rig 18 and disposed in wellbore 12 for performing these activities.

A working or service fluid source 52, such as a storage tank or vessel, may supply a working fluid 54 that is pumped to the upper end of tubing string 30 and flows through tubing string 30. Working fluid source 52 may supply any fluid utilized in wellbore operations, including without limitation, fracturing fluid, drilling fluid, spacer fluid, slurry, cement composition, acidizing fluid, liquid water, steam, hydraulic fracturing fluid, or some other type of fluid.

The Compositions

According to several exemplary embodiments, the combination of the borate salt, the amine, and the organosilane provides synergistic benefits in consolidating small particles or fines (e.g., sand) of a subterranean formation, without substantially reducing permeability. Without being bound by theory, it is believed that the borate salt and the amine form a network structure in the form of a tacky mixture or a viscous solution. The organosilane has a strong affinity for sand or similar particles, and can bind these particles together. The mixing of the borate salt, the amine, and the organosilane provides a combination that coats the particles and creates strong bonds between two particles. For example, the hydroxyl groups on sand link to the hydroxyl groups on the network structure when subjected to heat to release water, whereas the remaining hydroxyl groups attach to the hydrated silica, and the sand particles are brought together. Advantageously, the byproduct of the reaction is just water.

According to several exemplary embodiments, the composition enhances grain-to-grain contact between particulates within the formation (be they proppant particulates, formation fines, or other particulates), helping to bring about the consolidation of the particulates into a cohesive and permeable mass, stabilization of individual particulates or clusters of particulates, or facilitating the tendency of particulates to form into an optimum packing arrangement (e.g., for higher porosity or permeability).

According to several exemplary embodiments, the borate salt is any suitable borate source. Suitable borate sources include, but are not limited to, boric acid, sodium octaborate, disodium octaborate tetrahydrate, sodium diborate, pentaborates, sodium borate pentahydrate, sodium borate decahydrate, sodium metaborate, sodium tetraborate and combinations thereof. According to several exemplary embodiments, the borate salt is present in the composition in an amount in the range of about 5% to about 20% (w/v) of the composition, for example about 8% to about 18% (w/v) or about 10% to about 15% (w/v).

According to several exemplary embodiments, the amine includes any suitable amine, such as an aromatic amine, a polyamine, an aliphatic amine, a cyclo-aliphatic amine, an amide, or a polyamide. Representative amines include polyethylenimine, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethyleneimine, indazole, 2-ethyl-4-methyl imidazolepolyethylenimine, ethylenediamine, diethylenetriamine, triethylene tetraamine, amino ethyl piperazine, and combinations thereof. According to several exemplary embodiments, the amine is present in the composition in an amount of about 5% to about 10% by volume of the composition.

According to several exemplary embodiments, the organosilane includes N-2-(aminoethyl)-3-aminopropyltrimethoxysilane, 3-glycidoxypropyltrimethoxysilane, gamma-aminopropyltriethoxysilane, N-b eta-(aminoethyl)-gamma-aminopropyltrimethoxysilane, aminoethyl-N-beta-(aminoethyl)-gamma-aminopropyl-trimethoxysilane, gamma-ureidopropyl-triethoxysilane, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta (aminoethyl)-r-aminopropyltrimethoxysilane, N-beta (aminoethyl)-r-aminopropylmethyldimethoxysilane, 3-aminopropyl-triethoxy silane, N-phenyl-r-aminopropyltrimethoxysilane, r-mercaptopropyltrimethoxysilane, r-chloropropyltrimethoxysilane, vinyltrichlorosilane, vinyltris (betamethoxyethoxy) silane, r-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta (aminoethyl)-r-aminopropyltrimethoxysilane, N-beta (aminoethyl)-r-aminopropylmethyldimethoxysilane, r-aminopropyltriethoxysilane, N-phenyl-r-aminopropyltrimethoxysilane, r-mercaptopropyltrimethoxysilane, r-chloropropyltrimethoxysilane and combinations thereof. According to several exemplary embodiments, the organosilane is present in the composition in an amount of about 5% to about 10% by volume of the composition.

According to several exemplary embodiments, the composition further includes a strength enhancer. According to several exemplary embodiments, the strength enhancer includes amino phenols, 5-hydroxytryptamine, diaminobiphenols, tridimethylaminomethyl phenol, or any combination thereof. According to several exemplary embodiments, the strength enhancer includes tridimethylaminomethyl phenol. According to several exemplary embodiments, the strength enhancer is present in an amount of about 5% to about 10% by volume of the composition.

According to several exemplary embodiments, the composition further includes a solvent. According to several exemplary embodiments, the solvent is a solvent of the borate salt, the amine, the organosilane, and/or the strength enhancer (when present). According to several exemplary embodiments, the solvents include water, an organic solvent, and combinations thereof.

Suitable organic solvents include, but are not limited to, alcohols such as methanol or ethanol, amines such as ethylenediamine, or ethers such as ethylene glycol monobutyl ether. According to several exemplary embodiments, the solvents are present in an amount of about 50% to about 85% by volume of the composition.

Treatment Fluids that Include the Compositions

According to several exemplary embodiments, the compositions are used in conjunction with any suitable subterranean treatment fluid (e.g., a fracturing fluid). As used herein, the term "treatment" or "treating" refers to any subterranean operation that uses a fluid in conjunction with a desired function and/or for a desired purpose. The term "treatment" or "treating" does not imply any particular action by the fluid or any particular component thereof.

According to several exemplary embodiments, the borate salt is present in the treatment fluid in an amount of about 0.1% to about 10% (w/v) of the treatment fluid, for example about 1% to about 5% (w/v). According to several exemplary embodiments, the amine is present in an amount of about 0.01% to about 5% by volume of the treatment fluid, for example about 0.05% to about 1% by volume of the treatment fluid. According to several exemplary embodiments, the organosilane is present in an amount of about 0.01% to about 5% by volume of the treatment fluid, for example about 0.05% to about 2% by volume of the treatment fluid. According to several exemplary embodiments, the strength enhancer, when present, is present in an amount of about 0.01% to about 5% by volume of the treatment fluid, for example about 0.05% to about 2% by volume of the treatment fluid.

According to several exemplary embodiments, the composition is added to a fracturing fluid and then placed downhole with the fracturing fluid during the fracturing operation. According to several exemplary embodiments, the composition is added to a gravel pack fluid and introduced to a subterranean formation with the gravel pack fluid. Other treatments in which the composition may be introduced into a subterranean formation include remedial or matrix treatments.

According to several exemplary embodiments, the composition is used in conjunction with an aqueous treatment fluid. Suitable aqueous treatment fluids include fresh water, salt water, brine, seawater, or any other aqueous liquid that does not adversely react with the other components or with the subterranean formation.

According to several exemplary embodiments, the treatment fluid is foamed. One advantage of using a foamed treatment fluid over a nonfoamed treatment fluid is that less aqueous fluid is used. This may be important in subterranean formations that are water-sensitive. According to several exemplary embodiments, the foamed treatment fluids have a foam quality of about 30% or above. According to several exemplary embodiments, the foam quality level is about 50% or above. According to several exemplary embodiments, the treatment fluid includes a foaming agent and optionally a suitable surfactant.

According to several exemplary embodiments, the treatment fluid may include a gelling agent. Any gelling agent suitable for use in subterranean applications may be used, including, but not limited to, natural biopolymers, synthetic polymers, crosslinked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, welan, gellan, xanthan, tragacanth, and carrageenan, and derivatives of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone.

Sand Control

According to several exemplary embodiments, methods of using the composition relate to sand control (e.g., control of sand migration), where an effective amount of the composition is introduced into a subterranean formation to chemically enhance sand aggregation or sand consolidation within the formation. After the consolidation of the sand particles, the subterranean formation can produce hydrocarbons and/or liquids at a higher substantially sand free rate, thus, maximizing sand free production rates of the formation.

According to several exemplary embodiments, the composition is introduced into the formation after a fracturing treatment or a gravel pack treatment has been performed to stabilize sand particulates within a zone of the subterranean formation. According to several exemplary embodiments, the composition may disperse any loose fines within a proppant pack in a fracture, move any fines away from the fracture (or near wellbore), stabilize gravel particulates around a screen, stabilize a screen failure, and/or lock the fines in the formation.

According to several exemplary embodiments, the composition is introduced into a subterranean formation that is producing unconsolidated sand particulate material as a result of depletion or water breakthrough. The composition may stabilize and/or strengthen the sand particulates in the formation and thereby reduce their undesirable production.

According to several exemplary embodiments, the composition is introduced into an unconsolidated zone of a subterranean formation to stabilize sand particulates within a zone. According to several exemplary embodiments, the composition is placed before or as part of a pre-pad of a fracturing treatment into a subterranean formation. According to several exemplary embodiments, subsequent to placing the composition in the formation, the subterranean formation is fractured. This fracturing step may include the introduction of a plurality of sand particulates into the formation.

Microproppant Consolidation

After a wellbore is drilled, it may often be necessary to fracture the subterranean formation to enhance hydrocarbon production, especially in tight formations like shales and tight-gas sands. Access to the subterranean formation can be achieved by first creating an access conduit, such as a perforation, from the wellbore to the subterranean formation. Then, a fracturing fluid, often called a pad fluid, is introduced at pressures exceeding those required to maintain matrix flow in the formation to create or enhance at least one fracture that propagates from at least one access conduit. The pad fluid is followed by a treatment fluid including a proppant to prop the fracture open after pressure from the fluid is reduced. In some formations like shales, fractures can further branch into small fractures extending from a primary fracture giving depth and breadth to the fracture network created in the subterranean formation. As used herein, a "fracture network" refers to the access conduits, fractures, microfractures, and/or branches, man-made or otherwise, within a subterranean formation that are in fluid communication with the wellbore. As used herein, an "access conduit" refers to a passageway that provides fluid communication between the wellbore and the subterranean formation, which may include, but not be limited to, sliding sleeves, open holes in non-cased areas, holes made using a jetting tool, holes in the casing, and perforations. The proppants hold open the fracture network thereby maintaining the ability for fluid to flow through the fracture network to ultimately be produced at the surface.

Microproppants have proven useful in shale and tight gas fracturing, particularly in the pad stage during unconventional shale fracturing. They provide improved connectivity between created and/or naturally occurring microfractures with a generated primary fracture and hence significantly enhance conductivity and well production. However, these microproppants are prone to flow back during production. Additionally, when they start migrating along the microfractures, they can block or reduce the flow paths, leading to loss of conductivity of the primary fracture. When these particulates are entrained and migrate too near the wellbore region, they may severely impact production rate. Generally, microproppants are based on silica, fly ash, and/or other metal oxides (e.g., alumina oxide).

While conducting a fracturing operation, microproppants can either be pumped along with the pad fluid or can be pumped along with low viscosity fluid in alternate stages with high viscosity fluids carrying regular proppants. The fracturing operations result in forming at least a primary fracture propped open by regular conventional proppants and several branched secondary fractures or microfractures connected to the primary fracture and eventually to the wellbore propped open by microproppants.

The fracturing treatment may be performed in one or more stages, where different amounts, sizes, and/or concentrations of proppant or, in some stages, no proppant is provided into the fractures. For example, in certain instances, the fractures can be initiated with a fracturing fluid containing little or no proppant, then subsequent stages can provide the proppant to the fractures in a manner that fills and props open both the secondary and primary fractures. Given the small size of the secondary fractures, one or more of the stages may introduce a microproppant such that the particle size is less than the transverse dimension of the fracture when held open under fracturing pressure. In some cases, the micro-proppant may be smaller than 100 mesh (149 μm), and in certain instances equal to or smaller than 200 mesh (74 μm), 230 mesh (63 μm) or even 325 mesh (44 μm), or smaller. The stages can be arranged to provide proppant such that the secondary fractures are propped by the microproppant. The stages can also be arranged to provide the proppant and microproppant intermixed and/or some stages can provide substantially just microproppant and other stages can provide just larger proppant.

According to several exemplary embodiments, a composition including microproppant particulates, a borate salt, an amine, and an organosilane, is used in a primary method with a treatment fluid, such as a fracturing fluid or a gravel pack fluid. Optionally, the composition may further comprise a strength enhancer such as tridimethylaminomethyl phenol. One example of such a method includes providing a fracturing fluid that includes a composition of microproppant particulates, a borate salt, an amine, an organosilane, and a strength enhancer; placing the fracturing fluid into a subterranean formation at a pressure sufficient to create or enhance a fracture therein; and allowing the composition to at least partially consolidate particulates within a portion of the subterranean formation. According to several exemplary embodiments, the fracturing fluids in these embodiments include any suitable component usually found in fracturing fluids in view of the characteristics of the formation including, but not limited to, an aqueous base fluid, proppant particulates, gelling agents, surfactants, breakers, buffers, a gas phase (if the fracturing fluid is foamed or commingled), and coupling agents. One of ordinary skill in the art with the benefit of this disclosure will likely recognize the appropriate components in conjunction with the composition of the microproppant particulates, the borate salt, the amine, the organosilane, and the strength enhancer for use in a fracturing fluid for a given application.

Figure 2:
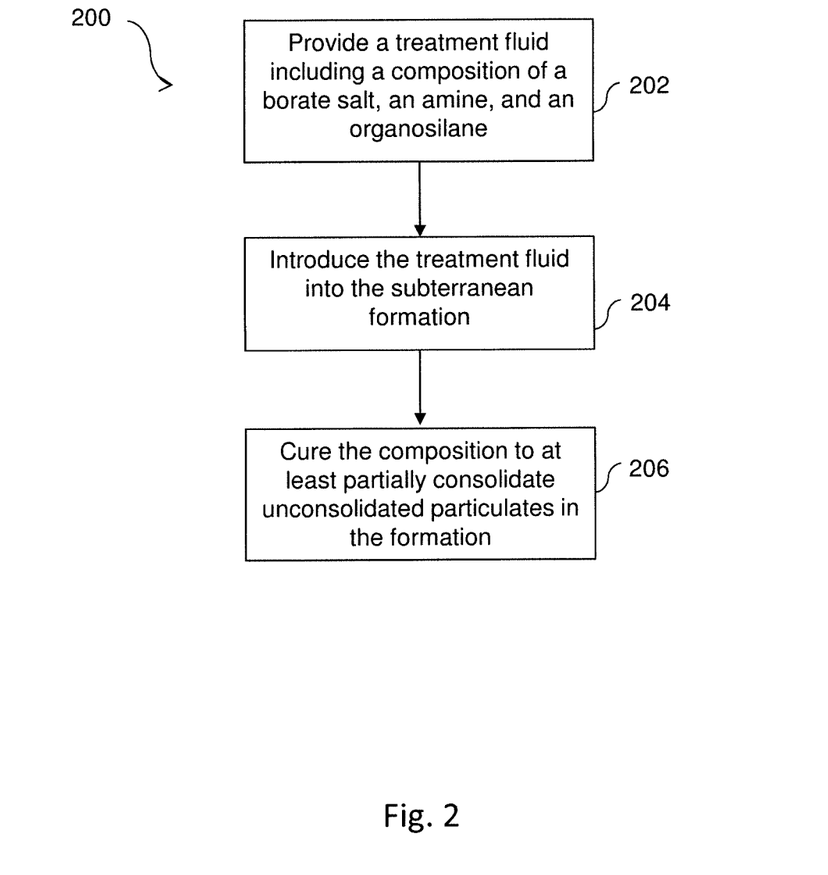
FIG. 2 depicts a method of treating a subterranean formation according to one or more embodiments of the present disclosure.

According to several exemplary embodiments, a method of treating a subterranean formation is provided. Turning now to FIG. 2, the method 200 includes providing a treatment fluid including a composition of a borate salt, an amine, and an organosilane in step 202, introducing, for example, pumping, the treatment fluid into the formation at step 204, and curing the composition to at least partially consolidate unconsolidated particulates in the formation at step 206.

According to several exemplary embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

The following examples are illustrative of the compositions, fluids, and methods discussed above and are not intended to be limiting.

EXAMPLE 1

Consolidation Properties of Compositions

Various combinations of materials were mixed with SSA-2™ sand and cured at 180° F. for a duration of 24 hours. A composition of a borate salt, an amine, and an organosilane produced a consolidated sandpack of SSA-2™ sand with an acceptable compressive strength. Addition of tridimethylaminomethyl phenol improved the UCS value, which is generally beneficial in the case of high drawdown of hydrocarbon.

Figure 3:
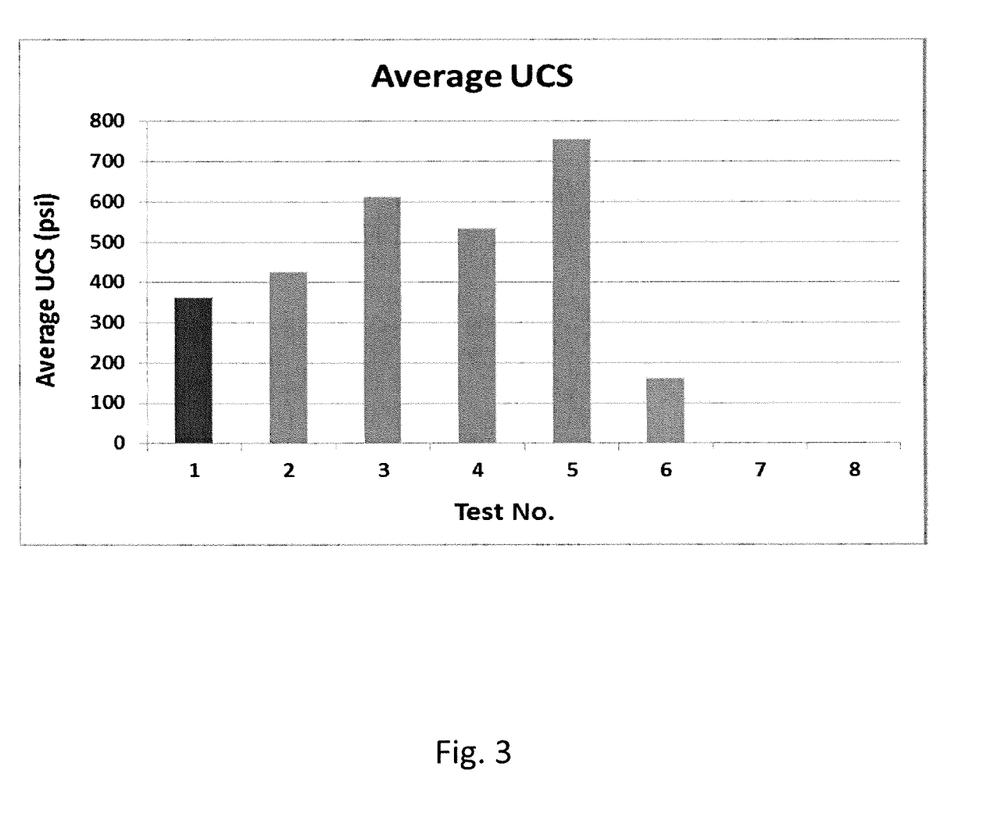
FIG. 3 illustrates the average unconfined compressed strength (UCS) of test compositions according to one or more embodiments of the present disclosure.

When one of the borate salt, the amine, or the organosilane was missing in the composition, no consolidation was observed. This demonstrates that there is a synergistic chemical association between the borate salt, the amine, and the organosilane, which consolidates small sand particles like SSA-2™ sand and provides higher compressive strength than a sandpack treated with an existing aqueous based resin system. Provided below in Table 1 are the compositions and the results of tests conducted to verify the effectiveness of the disclosed compositions. FIG. 3 presents the UCS values of the different test compositions in a bar graph.

TABLE 1

TESTED COMPOSITIONS AND CORRESPONDING STRENGTHS

| | Compositions | | Amounts | Average Unconfined Compressive Strength (UCS) (psi) |
|---|---|---|---|---|
| Test 1 | Brine | 3% KCl | 88 mL | 362 |
| (Existing | Part A | Epoxy Resin | 4.2 mL | |
| aqueous based | Part B | Amine | 4.2 mL | |
| resin system) | Part C | Organosilane | 3.6 mL | |
| | 100 mesh sand | SSA-2 ™ sand | 100 g | |
| Test 2 | Part A | 5% Aqueous sodium octaborate solution | 20 mL | 427 |

TABLE 1-continued

TESTED COMPOSITIONS AND CORRESPONDING STRENGTHS

|  |  | Compositions | Amounts |  | Average Unconfined Compressive Strength (UCS) (psi) |
|---|---|---|---|---|---|
|  | Part B | 60% Polyethylenimine* | 1 | mL |  |
|  | Part C | N-beta-(aminoethyl)-gamma-aminopropyltrimethoxysilane | 1 | mL |  |
|  | 100 mesh sand | SSA-2 ™ sand | 100 | g |  |
| Test 3 | Part A | 5% Aqueous sodium octaborate solution | 20 | mL | 612 |
|  | Part B | 60% Polyethylenimine* | 2 | mL |  |
|  | Part C | N-beta-(aminoethyl)-gamma-aminopropyltrimethoxysilane | 2 | mL |  |
|  | 100 mesh sand | SSA-2 ™ sand | 100 | g |  |
| Test 4 | Part A | 5% Aqueous sodium octaborate solution | 20 | mL | 535 |
|  | Part B | 60% Polyethylenimine* | 1 | mL |  |
|  | Part C | N beta-(aminoethyl)-gamma-aminopropyltrimethoxysilane | 1 | mL |  |
|  | Strength Enhancer | 60% 2,4,6 tridimethylaminomethyl phenol** | 1 | mL |  |
|  | 100 mesh sand | SSA-2 ™ sand | 100 | g |  |
| Test 5 | Part A | 5% Aqueous sodium octaborate solution | 20 | mL | 756 |
|  | Part B | 60% Polyethylenimine* | 2 | mL |  |
|  | Part C | N-beta-(aminoethyl)-gamma-aminopropyltrimethoxysilane | 2 | mL |  |
|  | Strength Enhancer | 60% 2,4,6 Tridimethylaminomethyl phenol** | 2 | mL |  |
|  | 100 mesh sand | SSA-2 ™ sand | 100 | g |  |
| Test 6 | Part A | 5% Aqueous sodium octaborate solution | 20 | mL | 162 |
|  | Part C | N-beta-(aminoethyl)-gamma-aminopropyltrimethoxysilane | 1 | mL |  |
| Test 7 | Part A | Fresh water | 20 | mL | 0 |
|  | Part B | 60% Polyethylenimine* | 1 | mL |  |
|  | Part C | N-beta-(aminoethyl)-gamma-aminopropyltrimethoxysilane | 1 | mL |  |
| Test 8 | Part A | 5% Aqueous sodium octaborate solution | 20 | mL | 0 |
|  | Part B | 60% Polyethylenimine* | 1 | mL |  |

*The solvent can be one of methanol, ethanol, or ethylene glycol monobutyl ether.
**The solvent can be one of methanol or ethanol, and ethylenediamine.

EXAMPLE 2

To simulate conditions in a subterranean formation, a sandpack with 100 mesh sand was prepared. A 100 mesh screen was placed on top of the lower end of a sand consolidation chamber. Next, 100 grams of SSA-2™ sand was taken and wetted with 2 mL of diesel. This minimized segregation of the smaller particles later on. Another 100 mesh screen was placed on top of the sandpack, and the consolidation chamber was rigged up to the fluid reservoirs.

The equipment was rigged up according to general procedures for performing sand consolidation treatment. For every stage discussed below, a back pressure of about 200 pounds per square inch (psi) was maintained. The initial permeability of the sandpack was measured at room temperature by flowing diesel through the sandpack at 3 mL/min. Next, an eight (8) pore volume of the Test 3 composition was pumped through the sandpack at 200° F. and 3 mL/min. The sandpack was then cured at 200° F. for 24 hours. After curing, the assembly was cooled to measure regain permeability at the same conditions that the initial permeability was measured. The core was then removed from the consolidation chamber to observe the consolidation obtained.

Figure 4:
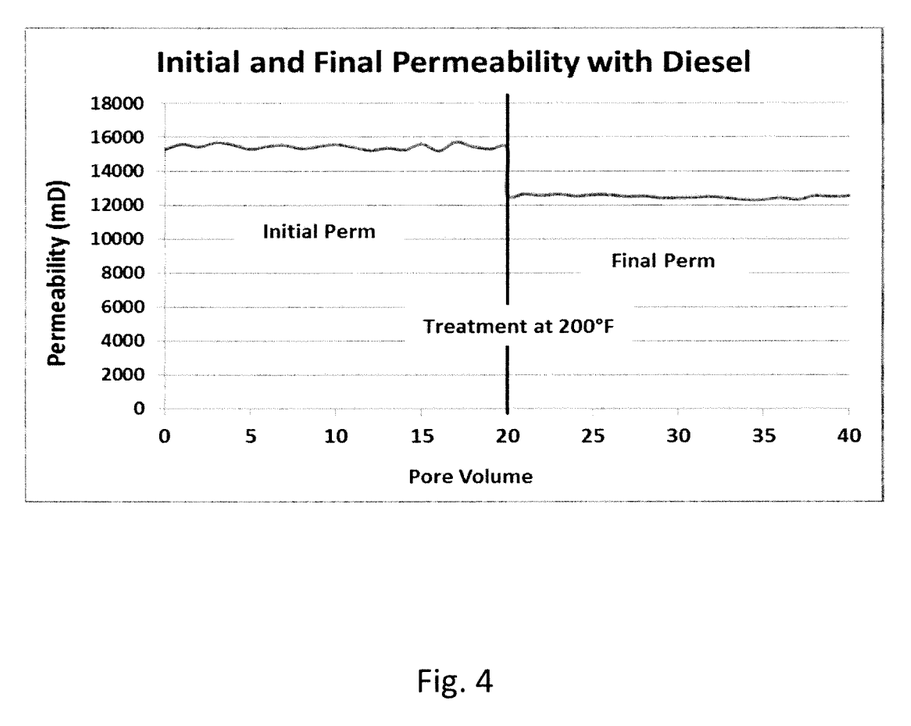
FIG. 4 illustrates the initial and final permeability of a test composition after treatment at 200° F. according to one or more embodiments of the present disclosure.

The results are provided in Table 2 below and the graph in FIG. 4. The results indicate that the permeability of the diesel through the consolidated sandpack was maintained.

TABLE 2

RESULTS OF PERMEABILITY TEST

| Stages | Permeability (mD) |
|---|---|
| Initial Permeability with Diesel | ~15500 |
| Treatment with Composition from Test 3, cured for 24 hours at 200° F. | — |
| Final Permeability with Diesel | ~12500 |
| % Regain | 80.64 |

What is claimed is:
1. A method of treating a subterranean formation, comprising:
providing a treatment fluid consisting of:
a borate salt,
an amine, and
an organosilane, wherein the organosilane is selected from one or more of N-2-(aminoethyl)-3-aminopropyltrimethoxysilane, 3-glycidoxypropyltrimethoxysilane, gamma-aminopropyltriethoxysilane, N-beta-(amino- ethyl)-gamma-aminopropyltrimethoxysilane, aminoethyl-N-beta-(aminoethyl)-gamma-aminopropyltrimethoxysilane, gamma-ureidopropyl-triethoxysilane, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-methacryloxypropyltrimethoxysilane, beta-(3,4 epoxycyclohexyl)-ethyltrimethoxysilane, r-glycidoxypropyltrimethoxysilane, r-glycidoxypropylmethyldiethoxysilane, N-beta (aminoethyl)-r-aminopropyltrimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (betamethoxyethoxy) silane, r-methacryloxypropyltrimethoxysilane, beta-(3,4 epoxycyclohexyl)-ethyltrimethoxysilane, r-glycidoxypropyltrimethoxysilane, r-glycidoxypropylmethyldiethoxysilane, N-beta (aminoethyl)-r-aminopropyltrimethoxysilane, N-beta (aminoethyl)-r-aminopropylmethyldimethoxysilane, r-aminopropyltriethoxysilane, N-phenyl-r-aminopropyltrimethoxysilane, r-mercaptopropyltrimethoxysilane, or r-chloropropyltrimethoxysilane, and optionally one or more additives selected from:
 a strength enhancer, wherein the strength enhancer is selected from amino phenols, 5-hydroxytryptamine, diaminobiphenols, tridimethylaminomethyl phenol, or a combination thereof,
 a solvent,
 a foaming agent,
 a surfactant,
 a gelling agent,
 proppant particulates,
 a breaker, or
 a buffer;
introducing the treatment fluid into the formation; and
curing the treatment fluid to at least partially consolidate unconsolidated particulates in the formation.

2. The method of claim 1, wherein the borate salt is present in an amount of about 5% to about 20% (w/v) of the treatment fluid, the amine is present in an amount of about 5% to about 10% by volume of the treatment fluid, and the organosilane is present in an amount of about 5% to about 10% by volume of the treatment fluid.

3. The method of claim 1, wherein the tridimethylaminomethyl phenol is present and is present in an amount of about 5% to about 10% by volume of the treatment fluid.

4. The method of claim 1, wherein the unconsolidated particulates comprise sand.

5. The method of claim 4, wherein the treatment fluid is introduced at a pressure below a pressure sufficient to create a fracture in the formation.

6. The method of claim 1, wherein the unconsolidated particulates comprise microproppant particulates.

7. The method of claim 6, wherein the treatment fluid is introduced at a pressure sufficient to create or enhance a fracture in the formation.

8. The method of claim 1, wherein the treatment fluid achieves a regain permeability of at least about 70%.

9. The method of claim 1, wherein:
 the borate salt comprises one or more of boric acid, sodium octaborate, disodium octaborate tetrahydrate, sodium diborate, pentaborates, sodium borate pentahydrate, sodium borate decahydrate, sodium metaborate, or sodium tetraborate; or the amine comprises one or more of polyethylenimine, piperazine, derivatives of piperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethyleneimine, indazole, 2-ethyl-4-methyl imidazolepolyethylenimine, ethylenediamine, diethylenetriamine, triethylene tetraamine, or amino ethyl piperazine.

10. The method of claim 9, wherein the borate salt comprises sodium octaborate, the amine comprises polyethylenimine, or the organosilane consists of N-beta-(aminoethyl)-gamma-aminopropyltrimethoxysilane.

11. The method of claim 1, wherein the borate salt is present in an amount of about 1% to about 5% (w/v) of the treatment fluid, the amine is present in an amount of about 0.05% to about 1% by volume of the treatment fluid, and the organosilane is present in an amount of about 0.05% to about 2% by volume of the treatment fluid.

12. The method of claim 11, wherein the treatment fluid includes the strength enhancer, and the strength enhancer is present in an amount of about 0.05% to about 2% by volume of the treatment fluid.

13. The method of claim 1, wherein the treatment fluid has an unconfined compressive strength of at least about 100 psi after curing at 180° F. for about 24 hours.

14. A method of treating a subterranean formation comprising unconsolidated particulates, comprising:
providing a treatment fluid consisting of:
 a borate salt,
 an amine, and
 an organosilane, wherein the organosilane is selected from one or more of N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilane, aminoethyl-N-beta-(aminoethyl)-gamma-aminopropyl-trimethoxysilane, gamma-ureidopropyl-triethoxysilane, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-methacryloxypropyltrimethoxysilane, beta-(3,4 epoxycyclohexyl)-ethyltrimethoxysilane, r-glycidoxypropyltrimethoxysilane, r-glycidoxypropylmethyldiethoxysilane, N-beta (aminoethyl)-r-aminopropyltrimethoxysilane, N-beta-(aminoethyl)-r-aminopropylmethyldimethoxysilane, 3-aminopropyl-triethoxysilane, N-phenyl-r-am inopropyltrimethoxysilane, r-mercaptopropyltrimethoxysilane, r-chloropropyltrimethoxysilane, vinyltris (betamethoxyethoxy) silane, r-methacryloxypropyltrimethoxysilane, beta-(3,4 epoxycyclohexyl)-ethyltrimethoxysilane, r-glycidoxypropyltrimethoxysilane, r-glycidoxypropylmethyldiethoxysilane, N-beta (aminoethyl)-r-aminopropyltrimethoxysilane, N-beta (aminoethyl)-r-aminopropylmethyldimethoxysilane, r-aminopropyltriethoxysilane, N-phenyl-r-aminopropyltrimethoxysilane, r-mercaptopropyltrimethoxysilane, or r-chloropropyltrimethoxysilane, and optionally one or more additives selected from:
- a strength enhancer, wherein the strength enhancer is selected from amino phenols, 5-hydroxytryptamine, diaminobiphenols, tridimethylaminomethyl phenol, or a combination thereof,
- a solvent,
- a foaming agent,
- a surfactant,
- a gelling agent,
- proppant particulates,
- a breaker, or
- a buffer;

introducing the treatment fluid into the formation;
allowing the treatment fluid to contact at least a portion of the unconsolidated particulates residing in a portion of the formation; and
curing the treatment fluid to at least partially consolidate the unconsolidated particulates, wherein the portion of the formation contacted with the treatment fluid has a regain permeability of at least about 60%.

15. The method of claim 14, wherein the borate salt is present in an amount of about 5% to about 20% (w/v) of the treatment fluid, the amine is present in an amount of about 5% to about 10% by volume of the treatment fluid, and the organosilane is present in an amount of about 5% to about 10% by volume of the treatment fluid.

16. The method of claim 14, wherein:
the borate salt comprises one or more of boric acid, sodium octaborate, disodium octaborate tetrahydrate, sodium diborate, pentaborates, sodium borate pentahydrate, sodium borate decahydrate, sodium metaborate, or sodium tetraborate; of
the amine comprises one or more of polyethylenimine, piperazine, derivatives of piperazine, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethyleneimine, indazole, 2-ethyl-4-methyl imidazolepolyethylenimine, ethylenediamine, diethylenetriamine, triethylene tetraamine, or amino ethyl piperazine.

17. The method of claim 14, wherein the borate salt comprises sodium octaborate, the amine comprises polyethylenimine, or the organosilane consists of N-beta-(aminoethyl)-gamma-aminopropyltrimethoxysilane.

18. The method of claim 14, wherein the treatment fluid includes the tridimethylaminomethyl phenol and tridimethyaminomethyl phenol is present in an amount of about 5% to about 10% by volume of the treatment fluid.

19. The method of claim 14, wherein the borate salt is present in an amount of about 1% to about 5% (w/v) of the treatment fluid, the amine is present in an amount of about 0.05% to about 1% by volume of the treatment fluid, and the organosilane is present in an amount of about 0.05% to about 2% by volume of the treatment fluid.

20. The method of claim 14, wherein the treatment fluid has an unconfined compressive strength of at least about 100 psi after curing at 180° F. for about 24 hours.

* * * * *

UNITED STATES PATENT AND TRADEMARK OFFICE
CERTIFICATE OF CORRECTION

PATENT NO. : 11,377,581 B2  
APPLICATION NO. : 17/266845  
DATED : July 5, 2022  
INVENTOR(S) : Ravikant S. Belakshe and Sumit Ramesh Songire Page 1 of 1

It is certified that error appears in the above-identified patent and that said Letters Patent is hereby corrected as shown below:

In the Claims

Claim 14, Column 16, Line 56, change "am inopropyltrimethoxysilane" to --aminopropyltrimethoxysilane--

Claim 16, Column 17, Line 32, change "of" to --or--

Claim 18, Column 18, Lines 21-22, change "tridim-ethyaminomethyl" to --tridimethylaminomethyl--

Signed and Sealed this  
Thirteenth Day of September, 2022

Katherine Kelly Vidal  
*Director of the United States Patent and Trademark Office*